Figure 2:
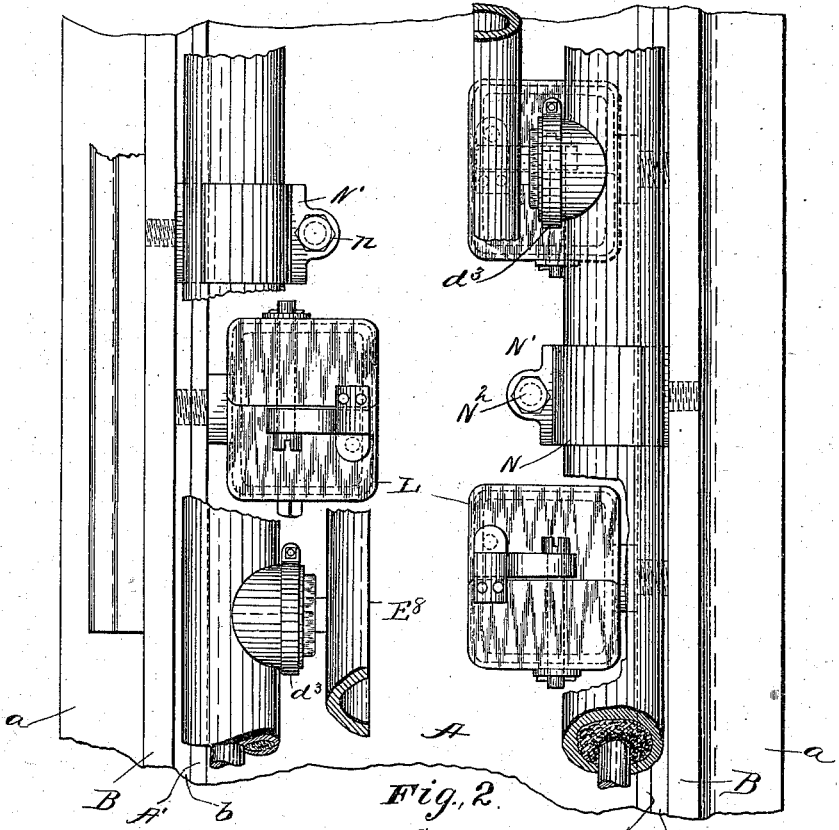

(No Model.) 5 Sheets—Sheet 1.

H. BRANDENBURG.
ELECTRIC RAILWAY.

No. 559,357. Patented May 5, 1896.

Witnesses
W. Rees Edelin
E. E. Gilbert

Inventor.
Henry Brandenburg (No Model.) H. BRANDENBURG. 5 Sheets—Sheet 2.
ELECTRIC RAILWAY.
No. 559,357. Patented May 5, 1896.
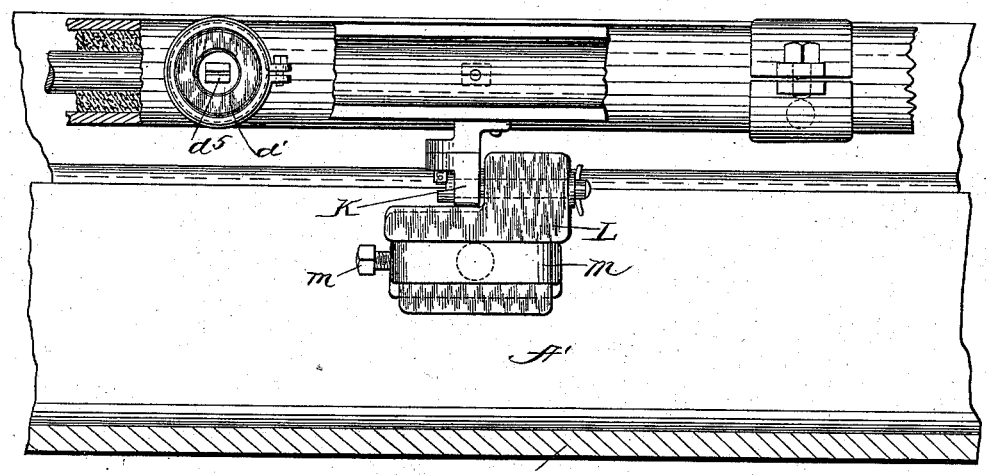
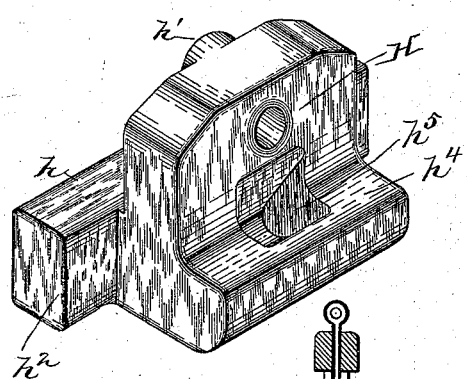
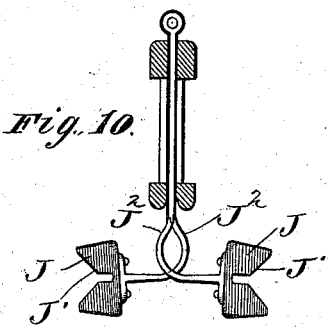
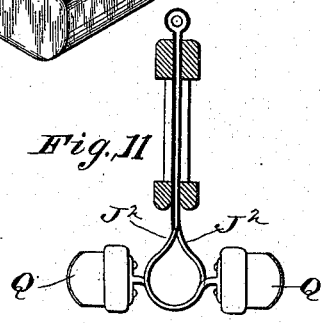
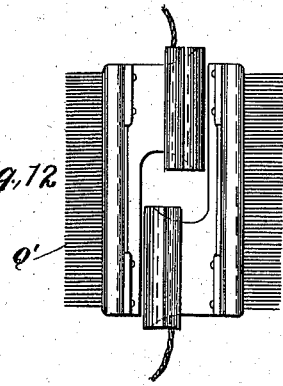
Witnesses
W. Ries Edelen.
E. Le Gilbert.
Inventor
Henry Brandenburg
ANDREW B.GRAHAM. PHOTO-LITHO. WASHINGTON. D.C.

(No Model.) 5 Sheets—Sheet 3.

H. BRANDENBURG.
ELECTRIC RAILWAY.

No. 559,357. Patented May 5, 1896.

Witnesses
W. Pers Edelen.
E. L. Gilbert

Inventor.
Henry Brandenburg (No Model.)  5 Sheets—Sheet 4.

H. BRANDENBURG.
ELECTRIC RAILWAY.

No. 559,357.  Patented May 5, 1896.

Witnesses  Inventor.

(No Model.)　　　　　　H. BRANDENBURG.　　　　5 Sheets—Sheet 5.
ELECTRIC RAILWAY.
No. 559,357.　　　　　　　　　　　Patented May 5, 1896.
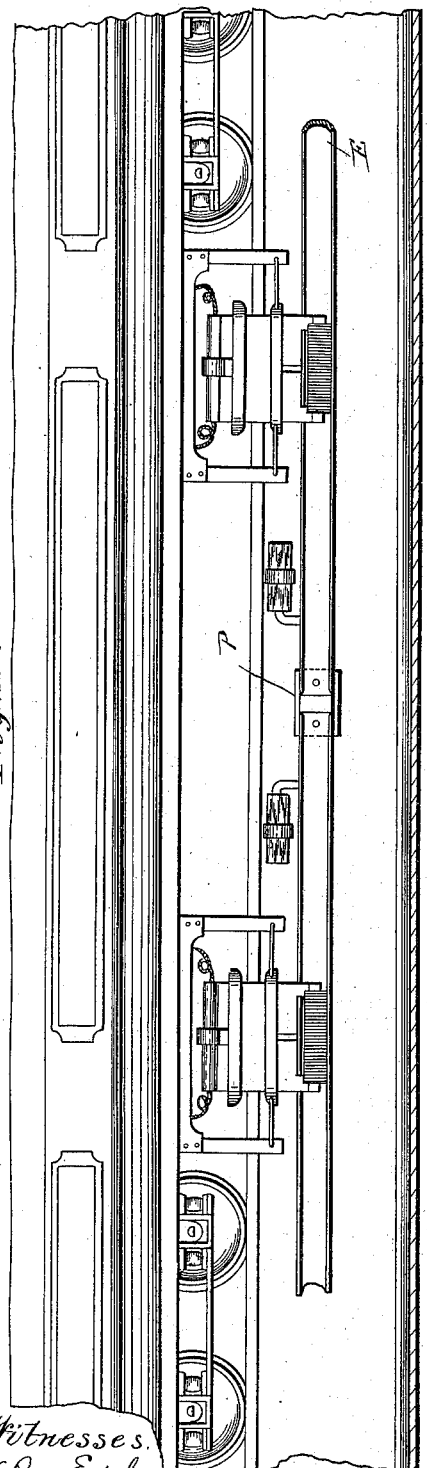
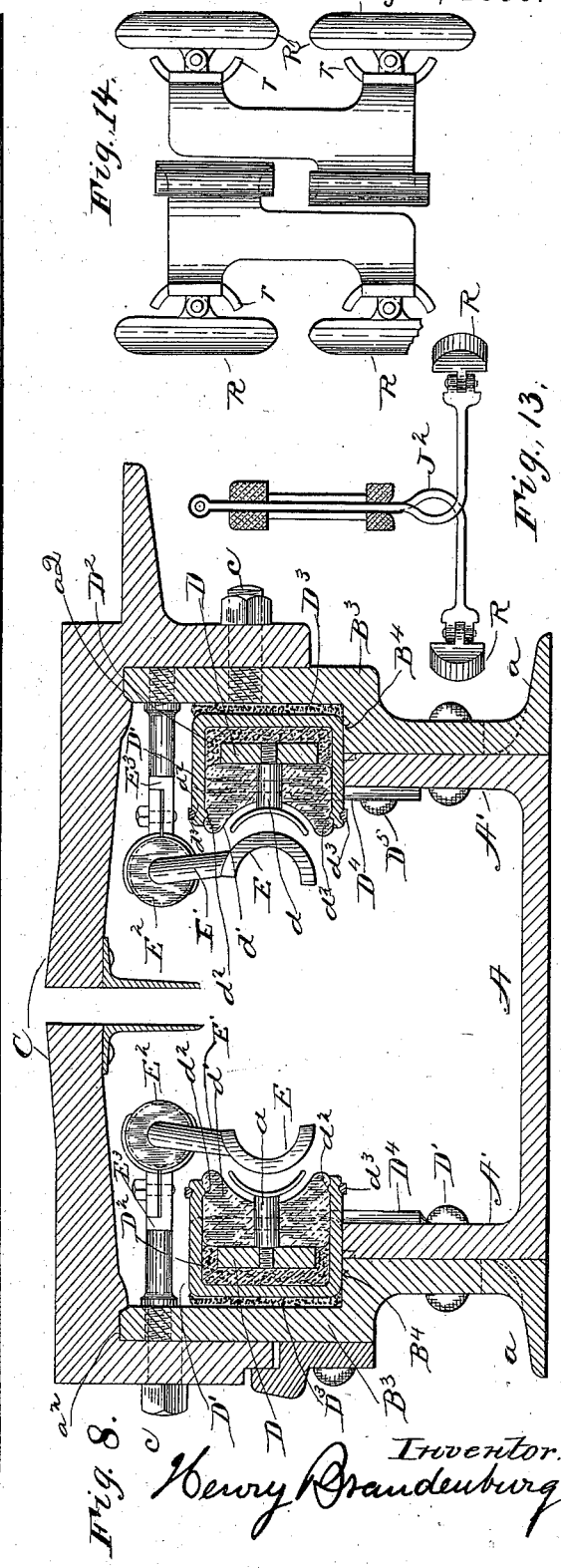
Witnesses:
W. Rus Edwin
E. C. Gilbert
Inventor.
Henry Brandenburg

UNITED STATES PATENT OFFICE.

HENRY BRANDENBURG, OF CHICAGO, ILLINOIS.

ELECTRIC RAILWAY.

SPECIFICATION forming part of Letters Patent No. 559,357, dated May 5, 1896.

Application filed May 2, 1895. Serial No. 547,917. (No model.)

*To all whom it may concern:*

Be it known that I, HENRY BRANDENBURG, of Chicago, in the county of Cook and State of Illinois, have invented certain new and useful Improvements in Electric Railways; and I do hereby declare the following to be a full, clear, and exact description of the same, reference being had to the accompanying drawings, forming a part of this specification, and to the letters of reference marked thereon.

The objects of the present invention are to provide a practical conduit system for electric roads, in which the conduit, in addition to its function as a conduit, may also form the support for or a part of one of the track-rails. Many efforts have been directed toward a practical solution of the difficulties incident to the construction of a system of this character; but the results attained are far from satisfactory, and in my present invention I have had in mind not only the production of a conduit construction wherein the current can be successfully transmitted to the moving vehicle without loss along the line of the road, but also the production of a conduit which, while strong and compact, may nevertheless be constructed of iron rolled with the appliances now in common use in iron-working, and further a conduit having a capability of being adapted to the particular locality where it is used—that is to say, where a deep conduit of large capacity is necessary to carry off drainage, as in low lands, it may be readily constructed, and, on the other hand, where the road-bed is shallow the conduit need be only of the depth of the ordinary web-rails, and hence is adapted to be laid in a similar manner directly on the cross-ties.

The invention consists in certain novel details of construction and combinations and arrangements of parts, all as will be now described, and pointed out particularly in the appended claims.

Figure 5:
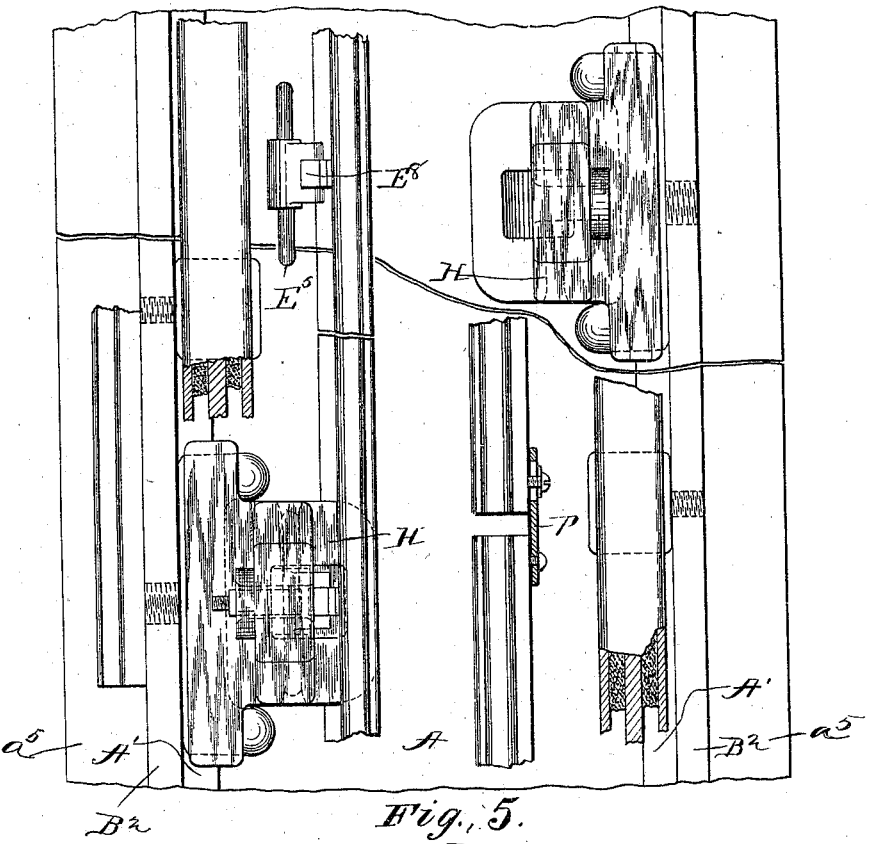
Figure 7:
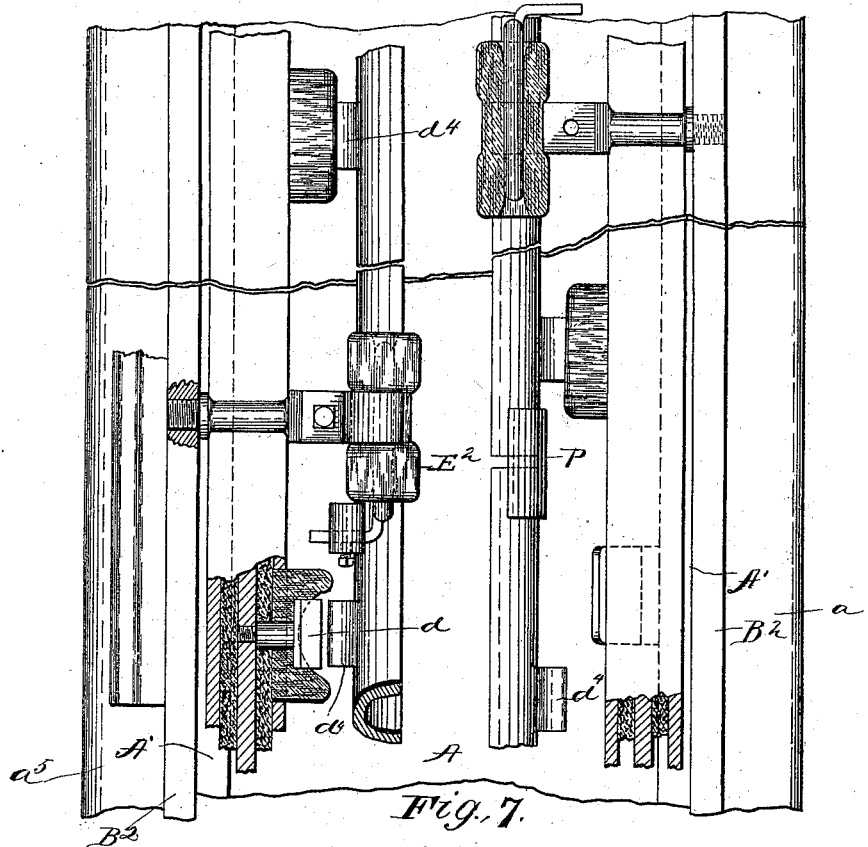

Referring to the accompanying drawings, Figures 1, 4, 6, and 8 are cross-sectional views through conduits constructed in accordance with my present invention, Fig. 8 representing the preferred embodiment. Figs. 2, 5, and 7 are top plans, with portions broken away and the slot-rails removed, of the forms of conduit illustrated in Figs. 1, 4, and 6, respectively. Fig. 3 is a side elevation of the trolley-wire conductor and insulator shown in Figs. 1 and 2. Fig. 9 is a detail perspective of one of the insulators, Figs. 4 and 5. Figs. 10 to 14 are details illustrating the forms of trolley used in connection with the various forms of trolley-conductor shown.

Similar letters of reference in the several figures indicate the same parts.

The conduit proper, by which I mean the inclosing member for the conductor or conductors and their insulating-supports, with the slot therein, is in my present invention preferably formed entirely of iron, being in fact built up from rolled rails of various cross-sectional shapes, as will be hereinafter more particularly described. The base or bottom portion of the conduit is in every instance preferably formed of an integral channel-iron—that is to say, an iron rolled into shape with a substantially flat base in cross-section and upwardly-extending flanges at each side. The depth of these flanges is in most instances immaterial, so they be of sufficient depth to allow for the firm attachment of cheek or side pieces, which extend upward above them and in turn form the support to which the slot-rails are rigidly attached.

Figure 1:
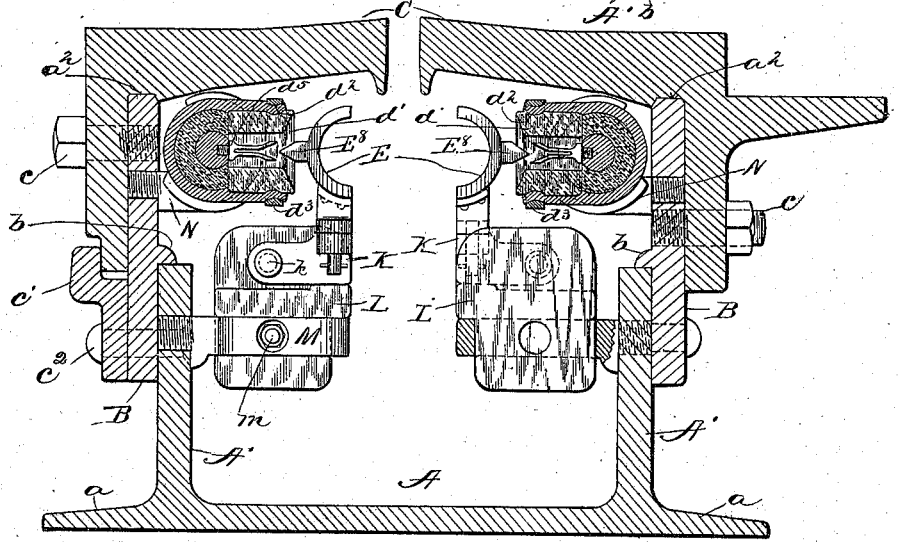

Referring now particularly to Fig. 1, it will be seen that the channel-iron (lettered A) has a wide flat base, which may rest securely upon the cross-ties, and in addition to the upwardly-extending flanges or webs A' it may have integral lateral flanges $a$, which serve to widen the base and afford a more secure support. The upwardly-extending flanges or webs A' have bolted to them side or cheek pieces B, and in addition to the bolts these cheek-pieces may have lips or projections $b$, which seat upon the edges of the flanges and tend to resist vertical thrust on the cheek-pieces, an important consideration when it is remembered that the slot-rails C, which are secured directly to these cheek-pieces, are adapted to bear the burden of traffic over them. The slot-rails themselves are of angle-iron or angular in form, with a seat $a^2$ in the angle for the edges of the cheek-pieces and means for connecting the downwardly-extending flange flat against said cheek-pieces. I preferably connect the downwardly-extending flanges to the cheek-pieces by bolts, such as $c$, and where it is desired to form the conduit so that one of the slot-rails may be readily removed for the inspection or repairs of the devices contained within it I provide clips $c'$ and attach them to the cheek-pieces by bolts $c^2$ in position to take over the lower edge of the removable slot-rail and thereby prevent it from tilting or pivoting on the upper edge of the cheek-piece. The overhanging edges of the slot-rails approach quite close together, and between them there is left sufficient space to form the slot for the entry of the trolley connections.

The particular conformation of the cheek-pieces and channel-iron, it is obvious, may be varied considerably and at the same time preserve all of the characteristics and secure the advantages incident to my invention. For instance, in Figs. 4, 6, and 8 it will be noted that the cheek-pieces (lettered in these figures respectively $B^2$ and $B^3$) extend down to the bottom level of the base and are provided with lateral flanges $a^5$, which form an additional support for the slot-rails, the channel-iron in this instance simply serving as the bottom of the conduit and as the support for the cheek-pieces.

In addition to forming a support for the cheek-pieces the edges of the channel-iron are in the preferred construction adapted to form seats for the insulators or inclosing sheaf of the conductors, and in the construction illustrated in Fig. 8 the cheek-pieces themselves are preferably recessed also or have shoulders $B^4$ formed on them on a level with the edges of the channel-iron, which shoulders constitute a portion of the bottoms of the seats for the conductors, thereby materially increasing the space within the conduit and at the same time insuring the structure against any displacement of the conductors by reason of the vibration and shocks to which the whole structure is constantly subjected.

In the before-mentioned preferred construction illustrated in Fig. 8 I have shown the conductors or more properly feed-wire conductors D rectangular in cross-section and inclosed within a lead casing $D'$ with an interposed insulator $D^2$, after the manner of the ordinary underground-cable constructions. This rectangular cable is seated upon the seat formed by the shoulders $B^4$ of the cheek-pieces and edge of the channel-iron, if desired, a suitable insulation $D^3$ being interposed, and it is held in place on said seat by a retainer $D^4$, which may be formed as a part of or attached to the channel-iron by bolts $D^5$, as shown in Fig. 8. As many of these retainers are employed as is necessary, and in fact they may constitute a flange which is continuous except for the spaces necessary in making the electrical connections between the trolley-conductor and feed-conductor. Where such a connection as this is to be made the lead inclosing casing is opened, as illustrated in cross-section in said Fig. 8, the insulation removed, and a contact-piece $d$ secured to the conductor with its outer end in position to engage or supply current to the trolley-conductor. In the preferred construction this contact is passed through a vitreous insulator $d'$, which is inserted in the opening in the lead covering of the cable and held in place by swaging the edges of the lead around the opening into recess $d^2$ in the insulator, and as an additional safeguard a retaining-band $d^3$ may be passed around the insulator and its inclosing lead, as shown clearly in said Fig. 8 and in Figs. 1 and 2.

The trolley-conductor E itself preferably consists of a conductor concavo-convex in cross-section having upwardly-extending arms $E'$, which fit into and take a horizontal bearing in insulators $E^2$, supported from the cheek-piece by brackets $E^3$. The brackets are of course made separable for the ready insertion of the vitrerous insulators, and the effect of the construction is to allow the trolley-conductors to hang pendulous from the insulators and in position for their curved outer surfaces to fit in and make good electrical contact with the contacts $d$ whenever the said trolley-conductors are deflected toward the sides of the conduit, as by the passage of a trolley, as will be presently explained.

Figure 6:
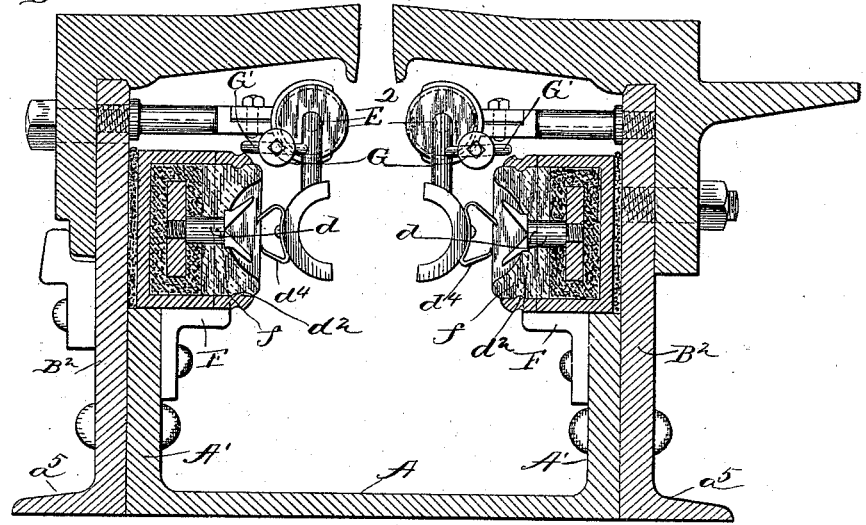

In Figs. 6 and 7 substantially the same arrangement as that just described is illustrated, save that the seats for the leaded cable are in this instance formed by the edges of the channel-iron and brackets F with upwardly-extending arms $f$ (dotted lines) secured to the inside of the channel-iron. In this instance also the trolley-conductors instead of making direct contact with the contacts $d$ have yielding contact-springs $d^4$ secured to them, and to insure the trolley-conductors standing out of engagement with the contacts adjustable counterweights G are mounted upon laterally-projecting arms $G'$ on the conductor-supports, and by their weight tend to hold the said trolley-conductors in toward the center of the conduit.

In Figs. 1 to 5 I have shown a construction wherein instead of suspending the trolley-conductors they are reversed and supported above their pivotal centers, the feed-conductors in these instances being located above the level of the pivotal supports for the trolley-conductors; but they are of substantially the same construction—that is to say, a leaded cable having openings into which contacts of any usual or suitable form are inserted and surrounded by an insulator of approved form adapted to fit snugly within the opening formed in the cable.

Figure 4:
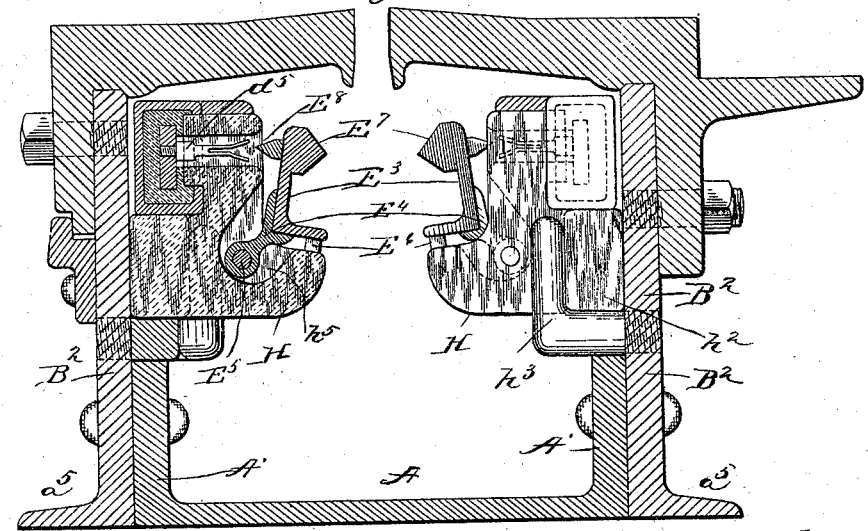

In Figs. 1 to 3 the cable is of the usual cylindrical construction, and in Figs. 4 and 5 it is rectangular, as described in connection with Fig. 8. In these latter figures the cable is supported by a large vitreous insulator H, Fig. 9, having a seat $h$ for the cable, a projection $h'$ for entering the opening in the cable, lateral wings $h^2$, adapted to fit in behind supporting bracket-hooks $h^3$ on the cheek-piece, and a forwardly-projecting flange $h^4$, in which a pivotal socket $h^5$ is formed for the support of the trolley-conductor. An opening extends through the projection $h'$ out to the front of the insulator-block, and in this opening the contact is inserted, as shown clearly in Fig. 4. The trolley-conductor in this instance is in the form of an angle-rod $E^3$, having at suitable intervals arms $E^4$ extending out from the angle thereof and provided with pintle-bearings $E^5$, Fig. 5, adapted to take a seat in the openings $H^5$ in the insulator-block. By extending the arms $E^4$ out from the angle of the rod the preponderance of weight is thrown to the inside of the pivotal center and the trolley-conductor or angle-rod carrying the conductor at the upper end will normally stand at an inclination, as shown in Fig. 4, in which position its lower arm or flange should be supported by a buffer of rawhide or some similar substance, (lettered $E^6$.) On the upper arm or flange of the angle-rod $E^3$ there is formed on the inner side a longitudinal angular projection $E^7$, constituting the bearing-surface for the trolley, and on the other side there are formed a series of contact-points $E^8$, which coöperate with the spring-jacks or contacts $d^5$. With this construction of trolley-conductor it is preferable to employ a trolley having contact-pieces as illustrated in Fig. 10—that is to say, the contact-pieces J have an angular recess $J'$ therein, into which the angular projection of the trolley-conductor projects—and the trolley-contacts are in this instance, as well as in the other forms of trolley to be presently mentioned, mounted on spring-arms $J^2$, which force the trolley-conductors apart with a firm but elastic pressure, and in addition to forcing them apart such construction affords a greater or less support for the trolley and insures a perfect contact with a minimum liability of derailment by reason of the body motions of the car.

In Figs. 1, 2, and 3, while the general arrangement just described in connection with Figs. 4 and 5 is preserved, yet the details of construction are slightly modified in that the trolley-conductors in this instance are concavo-convex in cross-section and are mounted upon angle-irons K, pivotally connected at the outer ends by pivots $k$ to the insulator-blocks L. These pivotal supports or angle-iron pivot-pieces K, together with the insulator-blocks, are located at suitable intervals along the conduit, and the insulator-blocks, it will be observed, are supported by means of a yoke or ring M, secured to the side of the conduit, and, if necessary, the connection is doubly insured by passing a bolt $m$ in through the yoke or ring M and into or against the lower portion of the insulator-block. The weight of the trolley-conductor tends to hold the same toward the center of the conduit, thereby breaking the electrical connection with the feed-conductor through the separation of the points $E^8$ and spring-jacks $d^5$. In this particular construction of feed-conductor, wherein the round lead-inclosed cable is employed, I prefer to use supporting brackets or clips N, with means for tightening the same upon the cable to prevent it from turning, as shown, this means consisting of an adjustable end extension $N'$, secured to the bracket N by a bolt $N^2$.

In all the forms of the invention it will be noted that the trolley-conductors, and feed-conductors as well, are located opposite to each other on the opposite sides of the slot, the position being such that a trolley entering between the trolley-conductors will be clamped thereby, and the trolley-conductors in turn will be forced outward by the trolley and into electrical connection with the feed-conductors, and consequently as the trolley-conductor is, as is ordinarily the case, separated into sections insulated one from the other, the current from the feed conductors is supplied only to the section or sections which are moved outward by the trolley, and there can be no leakage of current along the line except such as might possibly escape from the contact-points themselves. I prefer to connect the sections of the trolley-conductor together by means of insulation, such as P, thereby overcoming the danger which might otherwise exist of the trolley not opening each successive section properly.

The contacts for the trolley, it is obvious, should conform to the shape of the trolley-conductor, and it is immaterial whether they consist of smooth-faced contacts Q, as in Fig. 11, or brushes $Q'$, as in Fig. 12; but, as before stated, they should in every instance be mounted on spring-arms $J^2$, and I prefer to employ two separate and independently-pivoted contact-pieces R, Figs. 13 and 14, for each side of the trolley. These contact-pieces R are each allowed a certain amount of independent movement, such movement being limited by the stops $r$, and hence will conform accurately to the flexure of the trolley-conductor as the same is moved into or out of contact with the feed-conductor. In addition to the movement of independently-movable contact-points I also prefer to employ two independent trolleys for each vehicle, as shown, thereby insuring a more perfect collection of the current and a more perfect transmission of it through the motor or motors, more especially at the point where the trolleys move from one insulated section of the conductor to the next.

While I have shown lateral flanges on the cheek or side pieces, save in Figs. 1 and 2, it will be understood such construction is a mere matter of preference, and such flanges may be omitted or formed on the channel-iron, as indicated in dotted lines. One of the slot-rails is adapted to also form the track for the wheels of the car, being for this purpose rolled into any approved shape. I have shown the right-hand slot-rail with an ordinary bearing-shoulder and flange for the wheels.

Having thus described my invention, what I claim as new is—

1. A conduit for electric railways adapted to be supported on the rail-supporting cross-ties, consisting of a channel-iron having a flat base and upwardly-extending side webs, the independent cheek-pieces, rigidly secured against the outer sides of the upwardly-extending webs of the channel-iron, and having their upper edges extended above the said webs, and the angle-iron slot-rails having downwardly-extending webs rigidly secured to the outside faces of the cheek-pieces, whereby the structure is braced against any tendency of the slot-rails to spring inward; substantially as described.

2. A conduit for the trolley-conductors of an electric railway, consisting of the channel-iron having a flat base and upwardly-extending webs at each side, the cheek-pieces secured to said webs and having their upper edges extending above the same and their lower edges formed into flanges constituting an extension of the base, and the angle-iron slot-rails seated on the upper edges of the cheek-pieces and having their downwardly-extending flanges secured to said cheek-pieces; substantially as described.

3. In an electric railway, the combination with the channel-iron base having the upwardly-extending webs forming horizontal seats, and the slot-rails, of the conductors seated on the upwardly-extending webs of the channel-iron, with retainers for holding said conductors in place; substantially as described.

4. In an electric railway, the combination with the channel-iron base-piece having the upwardly-extending web forming horizontal seats, the cheek-pieces secured to said webs and extending above the level of the same, and the slot-rails connected with said cheek-pieces, of the conductors seated on the upwardly-extending webs of the channel-iron and retainers for holding said conductors in place; substantially as described.

5. In an electric-railway conduit, the combination with the oppositely-arranged cheek-pieces having longitudinal shoulders or seats formed on their proximate faces, and the channel-iron base having upwardly-extending webs to which the cheek-pieces are connected, of the conductors lying on said longitudinal seats or shoulders, and retainers for holding the conductors in place; substantially as described.

6. In an electric railway, the combination with the channel-iron base-piece having the upwardly-extending webs forming seats, the cheek-pieces secured to said webs and having shoulders or seats, and the slot-rails carried by the cheek-pieces, of the conductors supported on seats formed by the webs and cheek-pieces and retainers for holding said conductors in place; substantially as described.

7. A conductor for electric railways consisting of the insulated lead-covered cable with openings formed in said lead covering, vitreous insulators mounted in said openings and held in place by having the lead covering clamped thereto and contacts connected with the conductor extending through the vitreous insulators; substantially as described.

8. A conductor for electric railways consisting of the insulated lead-covered cable having openings formed in said lead covering, with the edges of the opening flanged outward vitreous insulators mounted in said openings, securing-bands passing around the flanged edges of the openings for holding said insulators in place and contacts in electrical connection with the conductor extending out through the insulators; substantially as described.

9. In an electric railway, the combination with the slotted conduit, the insulated feed-conductors mounted in said conduit and having contacts extending through their insulation, of the trolley-conductors extending longitudinally of the conduit and having laterally-extending pivotal supporting-arms and insulators in which said arms are journaled mounted in such relation to the feed-conductors as that the trolley-conductors when deflected will coöperate with the contacts to establish the electric circuit; substantially as described.

10. In an electric railway, the combination with the slotted conduit, oppositely-arranged insulators constituting the support for the movable trolley-conductors, the oppositely-arranged movable trolley-conductors extending longitudinally of the conduit and having transversely-arranged arms coöperating with the insulators, of the oppositely-arranged feed-conductor supported in proximity to the trolley-conductors and having contacts coöperating with said trolley-conductors to establish the electric circuit when the trolley-conductors are deflected; substantially as described.

11. In an electric railway, the combination with the oppositely-arranged trolley-conductors of the trolley for coöperation therewith having the independently-pivoted contact-shoes; substantially as described.

12. In an electric railway, the combination with the oppositely-arranged trolley-conductors, of the trolley having two independently-pivoted contact-shoes for coöperation with each conductor; substantially as described.

13. In an electric railway, the combination with the oppositely-arranged trolley-conductors, of the trolley having two independently-pivoted contact-shoes for coöperation with each conductor, the oppositely-arranged spring-arms upon which the said contacts are mounted; substantially as described.

HENRY BRANDENBURG.

Witnesses:
A. M. KELLY,
ALEX. S. STEUART.